US011308548B2

(12) United States Patent
He

(10) Patent No.: US 11,308,548 B2
(45) Date of Patent: Apr. 19, 2022

(54) INFORMATION PROCESSING METHODS AND DEVICE FOR TRYING ON CLOTHES

(71) Applicant: JOYME PTE. LTD., Singapore (SG)

(72) Inventor: Yandan He, Beijing (CN)

(73) Assignee: HONG KONG LIVEME CORPORATION LIMITED, Hong Kong (CN)

(*) Notice: Subject to any disclaimer, the term of this patent is extended or adjusted under 35 U.S.C. 154(b) by 0 days.

(21) Appl. No.: 16/647,804

(22) PCT Filed: Sep. 28, 2018

(86) PCT No.: PCT/CN2018/108365
§ 371 (c)(1),
(2) Date: Mar. 16, 2020

(87) PCT Pub. No.: WO2019/205491
PCT Pub. Date: Oct. 31, 2019

(65) Prior Publication Data
US 2020/0219177 A1    Jul. 9, 2020

(30) Foreign Application Priority Data
Apr. 28, 2018  (CN) .......................... 201810403890.9

(51) Int. Cl.
*G06Q 30/00*    (2012.01)
*G06Q 30/06*    (2012.01)
(Continued)

(52) U.S. Cl.
CPC ......... *G06Q 30/0643* (2013.01); *G06Q 30/00* (2013.01); *G06Q 30/06* (2013.01);
(Continued)

(58) Field of Classification Search
CPC . G06Q 30/0601–0645; G06Q 30/0631; G06Q 30/0643
(Continued)

(56) References Cited

U.S. PATENT DOCUMENTS 9,996,981 B1 * 6/2018  Tran ..................... G06K 9/4671
2011/0107263 A1 * 5/2011  Ivanov ................. G06Q 10/087
715/823

(Continued)

FOREIGN PATENT DOCUMENTS

CN    104820927 A    8/2015
CN    107451896 A    12/2017

OTHER PUBLICATIONS

Reader, Ruth. "Ralph Lauren and Oak Labs launch the fitting room of the future" (2015) VentureBeat.com (Year: 2015).*
(Continued)

*Primary Examiner* — Allison G Wood
*Assistant Examiner* — Katherine A Barlow
(74) *Attorney, Agent, or Firm* — Osha Bergman Watanabe & Burton LLP

(57) ABSTRACT

An information processing method and device based on clothes trying on are disclosed. The method includes the following. Clothes is displayed by a dressing mirror based on clothes information. A user operation is detected by the dressing mirror during displaying the clothes. In a case of detecting that a user operation is a photographing operation, in response to the photographing operation, an image is captured and the captured image is transmitted to a first client through a server. In a case that the server generates recommendation information based on the captured image, the recommendation information is acquired by the dressing mirror from the server and the clothes is displayed based on the recommendation information.

18 Claims, 8 Drawing Sheets

(51) Int. Cl.
*H04L 67/53* (2022.01)
*H04L 67/50* (2022.01)

(52) U.S. Cl.
CPC ......... *G06Q 30/0631* (2013.01); *H04L 67/20* (2013.01); *H04L 67/22* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 2014/0111449 A1* | 4/2014 | Lee | G06F 3/041 345/173 |
| 2015/0262288 A1* | 9/2015 | Cypher | G06K 7/10366 705/27.2 |
| 2015/0359462 A1* | 12/2015 | Laan | A61B 5/1077 348/47 |
| 2016/0234147 A1* | 8/2016 | Joel | H04W 4/60 |
| 2018/0052919 A1* | 2/2018 | Feldman | G06Q 30/0623 |

OTHER PUBLICATIONS

Yurieff, Kaya. "Amazon's smart mirror patent teases the future of fashion" Money.CNN.com (Year: 2018).*
International Search Report issued in corresponding International Application No. PCT/CN2018/108365 dated Jan. 30, 2019 (2 pages).
Written Opinion issued in corresponding International Application No. PCT/CN2018/108365 dated Jan. 30, 2019 (4 pages).

\* cited by examiner

INFORMATION PROCESSING METHODS AND DEVICE FOR TRYING ON CLOTHES

CROSS-REFERENCE TO RELATED APPLICATIONS

This application is a US national application of PCT application No. PCT/CN2018/108365, file on Sep. 28, 2018, which claims priority to and benefits of Chinese Patent Application Serial No. 201810403890.9, filed on Apr. 28, 2018 by LIVE.ME INC, the entire contents of which are incorporated herein by reference.

FIELD

The present disclosure relates to a technology field of mobile terminals, and more particularly, to an information processing method and apparatus based on clothes trying on.

BACKGROUND

With the development of technology of mobile terminals, a smart dressing mirror is used in a various clothes stores. A user may browse all clothes in a clothes store through the smart dressing mirror, providing convenience to the user. In addition, a display of trying on clothes may be provided based on his/her preference clothes selected by the user.

SUMMARY

Embodiments of the present disclosure provide an information processing method based on clothes trying on. The method includes:

displaying, by a dressing mirror, clothes based on clothes information;

detecting, by the dressing mirror, a user operation during displaying the clothes;

in a case detecting that the user operation is a photographing operation, in response to the photographing operation, capturing an image by an image capturing module invoked by the dressing mirror and transmitting the captured image to a first client through a server; and in a case that the server generates recommendation information based on the captured image, acquiring, by the dressing mirror, the recommendation information from the server and displaying the clothes based on the recommendation information.

Embodiments of the present disclosure provide an information processing method based on clothes trying on, including:

acquiring, by a server, a captured image from a dressing mirror; in which the captured image is acquired by an image capturing module invoked by the dressing mirror in response to a photographing operation, in a case of detecting that the user operation is the photographing operation, during displaying, by the dressing mirror, the clothes based on the clothes information;

transmitting the captured image to a first client correspondingly and generating recommendation information based on the captured image by the server; and transmitting the recommendation information to the dressing mirror, such that the dressing mirror display the clothes based on the recommendation information.

Embodiments of the present disclosure provide a computer device, including: a memory, a processor and a computer program stored on the memory and executable on the processor. When the computer program is executed by the processor, the information processing method based on clothes trying on described above is implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and additional aspects and advantages of the present disclosure will become apparent and more readily appreciated from the following descriptions made with reference to the accompanying drawings, in which.

DETAILED DESCRIPTION

Figure 1:
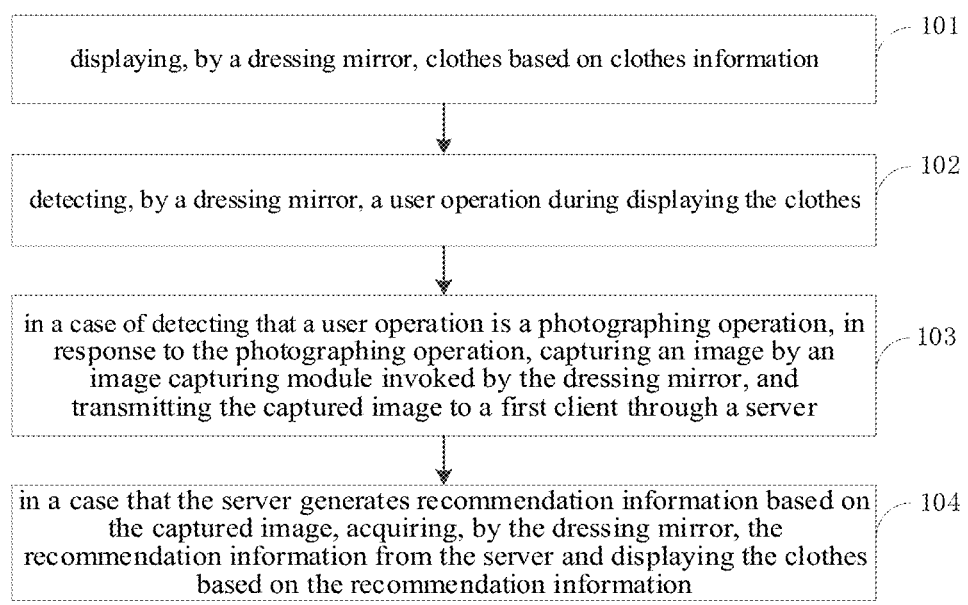
FIG. 1 is a schematic flow chart illustrating an information processing method based on clothes trying on according to embodiments of the present disclosure.

Reference will be made in detail to embodiments of the present disclosure. Examples of embodiments will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

In the related art, most smart dressing mirrors in the clothes store may provide a displaying of trying on virtual clothes. That is, a display screen of the dressing mirror may only display an effect of trying on the clothes selected by the user, and thus the function is single.

Therefore, an information processing method based on clothes trying on is provided to display more accurate recommendation information of the clothes for the user based on the user data. In addition, the captured image is transmitted to a client through the server and an association relationship between the server and the client is established, to further recommend the clothes information to the client, thereby improving a user viscosity.

An information processing method and apparatus based on clothes trying on according to embodiments of the present disclosure will be described below with reference to the accompanying drawings.

FIG. 1 is a schematic flow chart illustrating an information processing method based on clothes trying on according to embodiments of the present disclosure. The method may be executed by an end of dressing mirror.

As illustrated in FIG. 1, the method may include followings.

At block 101, clothes is displayed by the dressing mirror, based on clothes information.

In detail, the clothes may be displayed by the dressing mirror, based on the clothes information acquired from a server.

At block 102, a user operation is detected by the dressing mirror during a display of the clothes.

In detail, during the display of the clothes by the dressing mirror through display items, in a case where a period of time for displaying a certain display item reaches a preset duration, a trying-on control configured to acquire a trying-on operation may be displayed. In another example, during the display of the clothes by the dressing mirror end through the display items, the trying-on control may be displayed.

Further, after the display of the clothes by the dressing mirror, in a case that a clicking operation on the trying-on control by the user is not detected, a photographing control configured to obtain a photographing operation may be displayed by the dressing mirror.

It should be noted that, during the display of the clothes by the dressing mirror, multiple display items may be displayed in an interface. Each display item may contain information of the clothes to be displayed. The user may select a display item to display the corresponding clothes through an operation. For example, the operation may be a clicking operation or a screen-sliding operation.

At block 103, when detecting that the user operation is the photographing operation, an image capturing module is called by the dressing mirror to capture an image in response to the photographing operation, and the image is sent to a first client through the server.

The first client may refer to a client corresponding to the user who clicks the photographing control. The client may be a mobile phone, an ipad, a tablet computer and the like.

In detail, before the image is sent by the dressing mirror to the first client through the server, it needs to establish an association relationship between the dressing mirror and the first client. After the association relationship is established, the image of the user may be sent by the dressing mirror to the first client through the server. The manner of establishing the association relationship will be described in detail below.

At block 104, in response to detecting that the server generates recommendation information based on the image, the recommendation information is acquired by the dressing mirror from the server and the clothes is displayed based on the recommendation information.

In detail, after the image is acquired by the dressing mirror, the image may be sent to the server for saving and analyzing, such that the server may acquire a clothes preference of the user based on the image through analysis, to generate the recommendation information based on the clothes preference of the user. The dressing mirror may acquire the recommendation information from the server and display the clothes based on the recommendation information.

With the information processing method based on clothes trying on according to embodiments of the present disclosure, the clothes is displayed by the dressing mirror based on the clothes information. During the display of the clothes, the user operation is detected by the dressing mirror. In response to detecting that the user operation is the photographing operation, the image of the user is acquired by the dressing mirror and sent to the server to analyze clothes trying-on data of the user. The recommendation information is generated by the server based on the image and is displayed by the server. Therefore, accurate recommendation information of the clothes may be provided for the user based on the user data acquired. In addition, by sending the image to the client through the server and establishing the association relationship between the server and the client, the clothes information may be further recommended to the client to improve user viscosity Therefore, a problem existing in related arts, may be solved, that the dressing mirror cannot further provide the recommendation information of the clothes due to its monotonous function.

Figure 2:
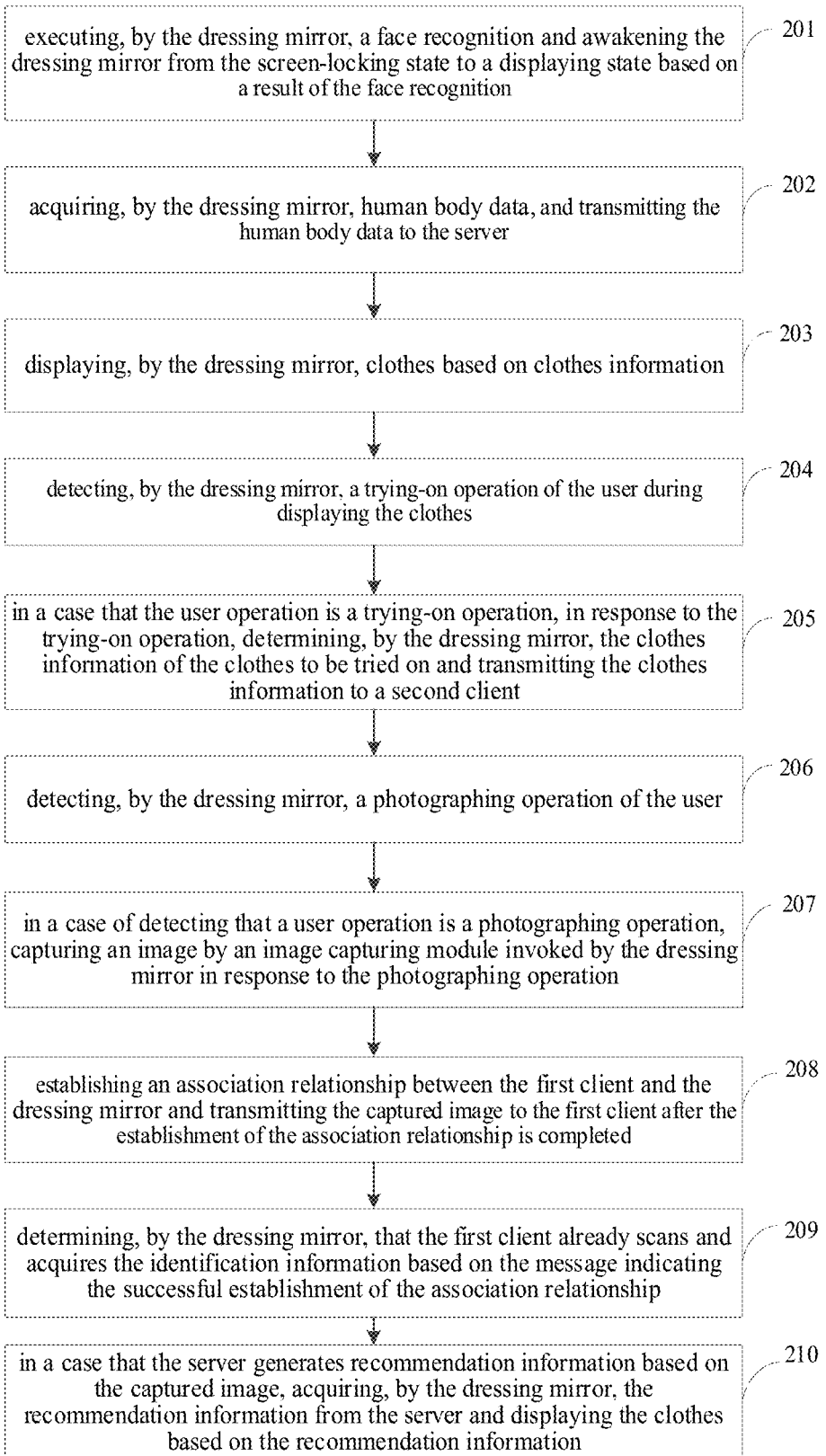
FIG. 2 is a schematic flow chart illustrating another information processing method based on clothes trying on according to embodiments of the present disclosure.

For clearly explaining the above embodiments, embodiments of the present disclosure further provide another possible implementation of the information processing method based on clothes trying on. FIG. 2 is a schematic flow chart illustrating another information processing method based on clothes trying on according to embodiments of the present disclosure. For ease of understanding, embodiments illustrated as FIG. 2 may be described by taking an actual application scenario that the user uses the dressing mirror as an example.

As illustrated in FIG. 2, the method may include the following.

At block 201, a face recognition is performed by the dressing mirror, and the dressing mirror is awakened from a screen-locking state to a displaying state based on a result of the face recognition.

In detail, an image is captured by the dressing mirror of which a mirror surface is in the screen-locking state. As a possible implementation, the dressing mirror may monitor whether a person is within a preset range in front of the dressing mirror in real time through an infrared sensor. In a case of detecting the person and a period of time that the person stays within the preset range in front of the dressing mirror exceeds a preset duration, a camera may be activated to execute capture the image. The dressing mirror may perform the face recognition with a face recognition algorithm based on the image captured. In a case of determining that a recognized face is different from a face recognized in a last awakening process, the dressing mirror may be awakened from the screen-locking state to the displaying state. The mirror surface of the dressing mirror may be in the screen-locking state in response to detecting no interactions from the user and may be served as a mirror. Therefore, power consumption of the dressing mirror may be reduced. By performing the face recognition on and distinguishing the face of the image, it may enable to avoid a case that the clothes is repeatedly displayed to the user to whom the clothes is a previously displayed in a last displaying thereby improving the user experience.

For example, the mirror surface of the dressing mirror may be in the screen-locking state in a case where the dressing mirror is not used by the user. An animation (a fairy image dancing on the screen) appears on the screen of the dressing mirror to attract the attention of the user. When the image capturing module detects a human face, a message "welcome to magic fairy mirror and please stay here and don't move" is prompted in voice. An activating and awakening animation is displayed on the interface, and the display screen of the dressing mirror is awakened from the screen-locking state to the displaying state.

At block 202, human body data is acquired by the dressing mirror and is sent to the server.

In detail, the human body data may be acquired by calling the image capturing module via the dressing mirror. As a possible implementation, the image capturing module of the dressing mirror may be a camera that is capable of acquiring a depth map, such as, a dual-camera system, a structured light camera, and the like. The human body data may be acquired based on the depth map of the user, and a 3D model of a human body may be established. The human body data may include at least one of a human body contour or a human body appearance. The human body data may be sent to the server, such that the server may perform analysis based on the received human body data to acquire characteristic data of the human body, such as height, thinness, hair length, body type, and the like, and to acquire the corresponding clothes information based on the data obtained through the analysis. By acquiring the human body data and analyzing the human body data via the server, the recommendation information of the clothes conforming to the user may be provided, thereby improving accuracy of the recommendation information of the clothes.

For example, the image capturing module of the dressing mirror may scan the human body, to obtain at least one of the human body contour or the human body appearance. The human body is scanned for 3 seconds. During the scanning process, a corresponding scanning animation may be displayed on the screen of the dressing mirror. After the scanning is completed, the acquired human body data may be sent to the server.

At block 203, the clothes is displayed by the dressing mirror based on the clothes information.

In detail, after the server generates the clothes information corresponding to the user based on the human body data, the dressing mirror may acquire the clothes information from the server and display the clothes information to the user. Therefore, a purpose that the dressing mirror may acquire and display the clothes information which is in line with characteristics of the human body by analyzing the human body data of the user is achieved, thereby saving time of selecting clothes and improving a transaction rate of a store.

Figure 3:
FIG. 3 is a schematic diagram of an interface of a dressing mirror according to embodiments of the present disclosure.

For example, after the scantling is completed, the dressing mirror may acquire and display clothes information generated by the server. FIG. 3 is a schematic diagram illustrating an interface of the dressing mirror according to embodiments of the present disclosure. As illustrated in FIG. 3, a display interface may include multiple display items. The display item corresponding to the clothes that is currently displayed is provided at the forefront in an enlarged manner. The user may perform a sliding operation on the display interface towards left and right. The user perform the sliding operation toward left to display a next display item, while the user performs the sliding operation toward right to display a previous display item. The displayed clothes information may include videos and pictures. In a case that the displayed information includes the videos, the videos may be displayed firstly. Each displayed clothes information may be accompanied with a type and a recommendation reason of the clothes, such as "lengthened autumn overcoat, leisure and fashion", "recommended by store manager", "hot style", and the like.

At block 204, the dressing mirror detects a trying-on operation of the user during the display of the clothes.

The trying-on operation may be acquired by clicking, by the user, the trying-on control on the display screen of the dressing mirror.

In detail, during the display of the clothes by the dressing mirror through the display item, the trying-on control configured to acquire the trying-on operation may be displayed in a case that a period of time for displaying a certain display item reaches a preset duration. In another example, the trying-on control may be displayed during the display of the clothes by the dressing mirror through the display item. It is detected whether the trying-on control is pressed by the user. The user may be prompted to try on the clothes by displaying the trying-on control. A relation between trying-on data and purchase data of the user may be acquired, to deduce the user's preference on the clothes and to provide a data basis for stocking up on clothes by the clothes store.

For example, during the display of the clothes information, a voice prompt may be provided based on the user operation. In a case where the user stays in front of a video interface for 30 seconds or a picture interface for 6 seconds without operation, a message of "you can click to try on this and have a real trying-on experience" is prompted. In a case that all resources are displayed in turn and automatically go back to a first one, a message of "You have seen them all. Don't you have any preference clothes You can select some clothes to try them on". The trying-on control may be displayed as well as the above voice prompt. In addition, it is detected whether the trying-on control is pressed down.

At block 205, after it is detected by the dressing mirror that the user operation is the trying-on operation, the clothes information to be tried on is determined in response to the trying-on operation.

In a scenario, after it is detected, by the dressing mirror, that the user operation is the trying-on operation, the clothes information to be tried on may be determined in response to the trying-on operation, and the clothes information to be tried on may be sent to a second client.

The second client refers to a client used by the user who may respond to the trying-on operation. For example, the second client may be the client used by a salesman of a store where the dressing mirror is located.

In detail, after it is detected, by the dressing mirror, that the user operation is the trying-on operation, in response to the trying-on operation, the clothes information corresponding to a trying-on page selected by the user is determined and the clothes information of the clothes to be tried on is sent to the second client. The user corresponding to the second client may provide the clothes to be tried on to the user based on the received clothes information of the clothes to be tried on. The user may acquire a corresponding trying-on service by clicking a trying-on button of his/her preference clothes, without frequently walking from the clothes store and the dressing room, thereby improving satisfaction of the user.

For example, as illustrated in FIG. 3, after the user clicks the trying-on control below the displayed clothes, the dressing mirror may prompt the user in voice while the user is waiting for the clothes, for example with the message of "please wait the salesman to provide the clothes for you, do you have any other clothes want to try on? You can try them on together!".

The above scenario describes a real clothes trying on method performed by the user. In another scenario, the user may virtually try on the clothes. In detail, after it is detected by the dressing mirror that the user operation is a virtual trying-on operation, a 3D model of the human body of the user may be displayed on the display screen in response to the virtual trying-on operation. A size of the clothes to be tried on by the user may be determined based on the size of the 3D model of the human body. A virtual trying-on effect may be displayed on the display screen, to help the user to determine whether the clothes is in line with his/her demand of dressing.

At block 206, a photographing operation of the user is detected by the dressing mirror.

In detail, after the user tries the clothes on, the dressing mirror may prompt in voice the user to perform the photographing operation and detect the photographing operation of the user. As a possible implementation, an action of the human body is tracked and recognized through the established human body 3D model. In a case that it is recognized that the user makes a preset action, the dressing mirror may determine that the user performs the photographing operation. The preset action may be a gesture action, such as a V-shaped hand gesture, or a limb action, such as a head touching gesture, an arkimbo gesture, which is not limited in embodiments. As another possible implementation, in response to detecting that the photographing control is pressed, it may be determined that the user performs the photographing operation.

At block 207, in a case of detecting, by the dressing mirror, that the user operation is the photographing operation, in response to the photographing operation, the dressing mirror may invoke the image capture module to capture the image.

In detail, after it is detected, by the dressing mirror, that the user operation is the photographing operation, the dressing mirror may invoke the image capture module to capture the image in response to the photographing operation to obtain an image of the user dressing on the clothes. By acquiring the image of the user dressing on the clothes, more user information may be acquired, such that the server may generate more accurate clothes recommendation information based on the image and human body information.

Figure 4:
FIG. 4 is a schematic diagram of an interface of a dressing mirror according to embodiments of the present disclosure.

FIG. 4 is a schematic diagram illustrating an interface of the dressing mirror according to embodiments of the present disclosure. After the dressing mirror detects that the user performs the photographing operation, the dressing mirror may invoke the image capturing module and remind the user to be ready. Countdown of "3, 2, 1" may be displayed on the interface of the dressing mirror and an image may be capture with a snap. The photographing control on the interface may be converted into a V-shaped hand gesture to indicate that the photographing is completed. After the photographing is completed, the image of the user dressing on the clothes is displayed transiently.

At block 208, the association relationship is established between the dressing mirror and the first client. The image is transmitted to the first client through the server after establishment of the association relationship is completed.

In detail, the dressing mirror may display identification information. The first client is configured to access the server based on the identification information, By establishing, by the server, the association relationship with the dressing mirror, when the dressing mirror acquires, from the server, an indication message indicating that the association relationship is successfully established from the server, the dressing mirror determines to execute transmitting the image captured to the first client through the server.

Figure 5:
FIG. 5 is a schematic diagram of an interface of a dressing mirror according to embodiments of the present disclosure.

In a specific application scenario, the identification information displayed at the dressing mirror may be a two-dimensional code corresponding to a social account. The first client may scan the two-dimensional code corresponding to the social account, follow the social account, to access the server, and to establish the association relation with the dressing mirror through the server. FIG. 5 is a schematic diagram illustrating an interface of the dressing mirror according to embodiments of the present disclosure. As illustrated in FIG. 5, after an image of the user is captured, the image of the user dressing on the clothes may be reduced and displayed at a side of two-dimensional code identification information. The dressing mirror may provide the message of "scan the two-dimensional code on the upper left and store a beautiful image into your phone" to the user to prompt the user to scan the two-dimensional code corresponding to the social account. Therefore, the association relationship between the first client corresponding to the user and the dressing mirror may be established. After the association relationship is established, the dressing mirror may transmit the image of the user dressing on the clothes to the first client.

At block 209, the dressing mirror may determine that the first client scans and acquires the identification information based on the indication message that the association relation is successfully established.

In detail, the first client is configured to follow the social account based on the identification information, such that the server may acquire a user preference of the first client according to the social account. The recommendation information may be generated based on the image and the user preference. The recommendation information may be pushed to the first client through the social account. The pushed information may include the clothes information of interest to the user, purchase address, price information, discount information size, inventory information of the corresponding clothes, and the like. The recommendation information may be pushed to the user through the social account, to provide the clothes information, thereby improving the user viscosity and providing convenience of purchasing the clothes for the user.

At block 210, in a case that the server generates the recommendation information based on the image, the dressing mirror acquires the recommendation information from the server and displays the clothes based on the recommendation information.

In detail, after the image is captured by the dressing mirror, the image may be transmitted to the server for storing and analyzing, such that the server may acquire information such as a number of pieces of trying-on clothes of the user, an identity (ID) of the trying-on clothes, a style of the trying-on clothes by analyzing the image, to deduce clothes preference of the user and to generate the recommendation information based on the clothes preference of the user. The dressing mirror may acquire the recommendation information from the server and displays the clothes to the user based on the recommendation information. By acquiring the image of the user and the human body data of the user, the dressing mirror may acquire and display more accurate recommendation information to the user, thereby improving interest and satisfaction of the user to try on the clothes.

As illustrated in FIG. 5, the clothes displayed on the interface is the recommendation information of the clothes, generated by the server based on the image of the user and the human body data of the user, that is well in conformity to the characteristics and preferences of the user. In addition, a prompt of "according to your image captured, we provide more suitable clothes for you" is provided to the user.

With the information processing method based on clothes trying on according to embodiments of the present disclosure, the dressing mirror performs the face recognition by capturing an image. It is determined whether to initiate the dressing mirror based on a result of the face recognition. Power consumption of the dressing mirror end may be reduced and a problem that the clothes are repeatedly recommended to the user in a short time may be avoided. The clothes are displayed based on the clothes information, During the display of the clothes information, the dressing mirror may detect the user operation and prompts the user to try the clothes on. The trying-on data of the user may be obtained by trying the clothes on, such that the store may know the clothes with a highest trying-on frequency to make an accurate market positioning. The user is prompted to capture the image after trying on the clothes. In a case that the user operation is the photographing operation, the image of the user may be obtained through the dressing mirror and transmitted to the server to analyze the trying-on data of the user. The clothes preference of the user may be deduced, such that the server may generate more accurate recommendation information of the clothes based on the image. The accurate recommendation information of the clothes may be obtained from the server for displaying. In addition, the server may transmit the image to the first client. The association relation between the server and the first client may be established, such that clothes preference of the user may be obtained. The server may further provide the recommendation information of the clothes to the client, thereby improving the user viscosity.

Figure 6:
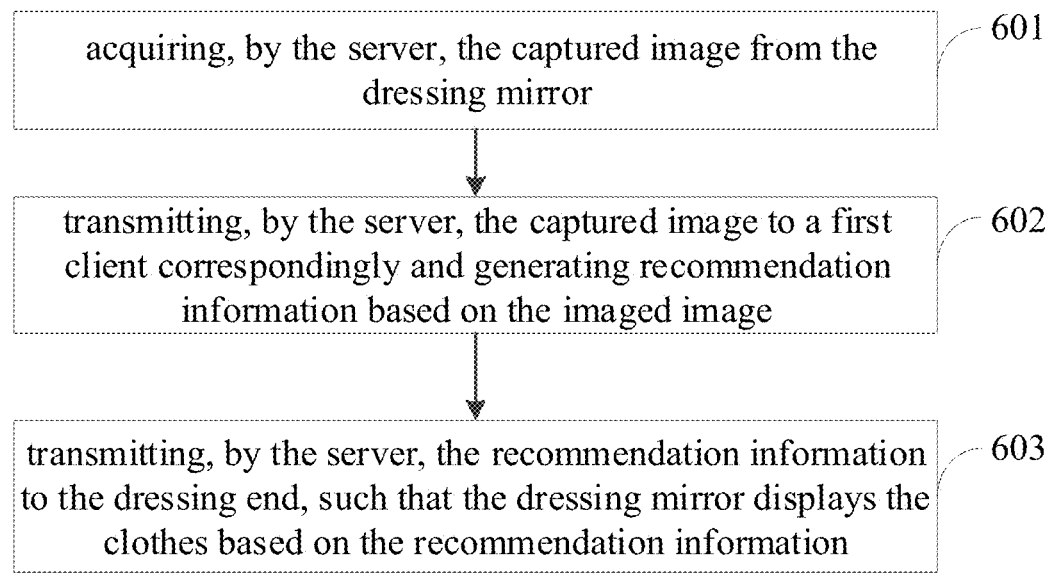
FIG. 6 is a schematic flow chart illustrating still another information processing method based on clothes trying on according to embodiments of the present disclosure.

Based on the above embodiment, the present disclosure further provides a possible implementation of an information processing method based on clothes trying on. FIG. 6 is a flow chart illustrating another information processing method based on clothes trying on according to embodiments of the present disclosure. The method may be executed at the server.

As illustrated in FIG. 6, the method may include the following.

At block 601, the server acquires the image captured from the dressing mirror.

The image captured is acquired by the dressing mirror by invoking the image capturing module, in response to the photographing operation, in a case of detecting that the user operation is the photographing operation, when the dressing mirror displays the clothes based on the clothes information.

In detail, the server may analyze the image captured acquired from the dressing mirror to acquire data such as an ID, a type and a style of the clothes tried on by the user, so as to deduce the clothes preference of the user.

At block 602, the server transmits e image captured to the first client and generates the recommendation information based on the image captured.

The first client refers to the client corresponding to the user on the clothes.

In detail, the server transmits the captured image of the user acquired from the dressing mirror to the corresponding first client, analyzes and deduces the user preference based on the captured image, and further generates the recommendation information.

At block 603, the server transmits the recommendation information to the dressing mirror, such that the dressing mirror may display the clothes based on the recommendation information.

With the information processing d based on clothes trying on according to embodiments of the present disclosure, the server acquires the captured image from the dressing mirror. The captured image is transmitted to the first client. The clothes preference of the user is deduced by analyzing the captured image, such that more accurate recommendation information of the clothes is generated based on the clothes preference of the user. The clothes recommendation information is transmitted to the dressing mirror, for displaying by the dressing mirror to the user. By acquiring trying-on data of the user, the user preference is obtained by analyzing the trying-on data. The recommendation information of the clothes is generated based on the user preference. Therefore, more accurate recommendation information of the clothes is generated by acquiring and utilizing the user data, thereby improving the accuracy of the recommendation information of the clothes and increasing the user viscosity.

Figure 7:
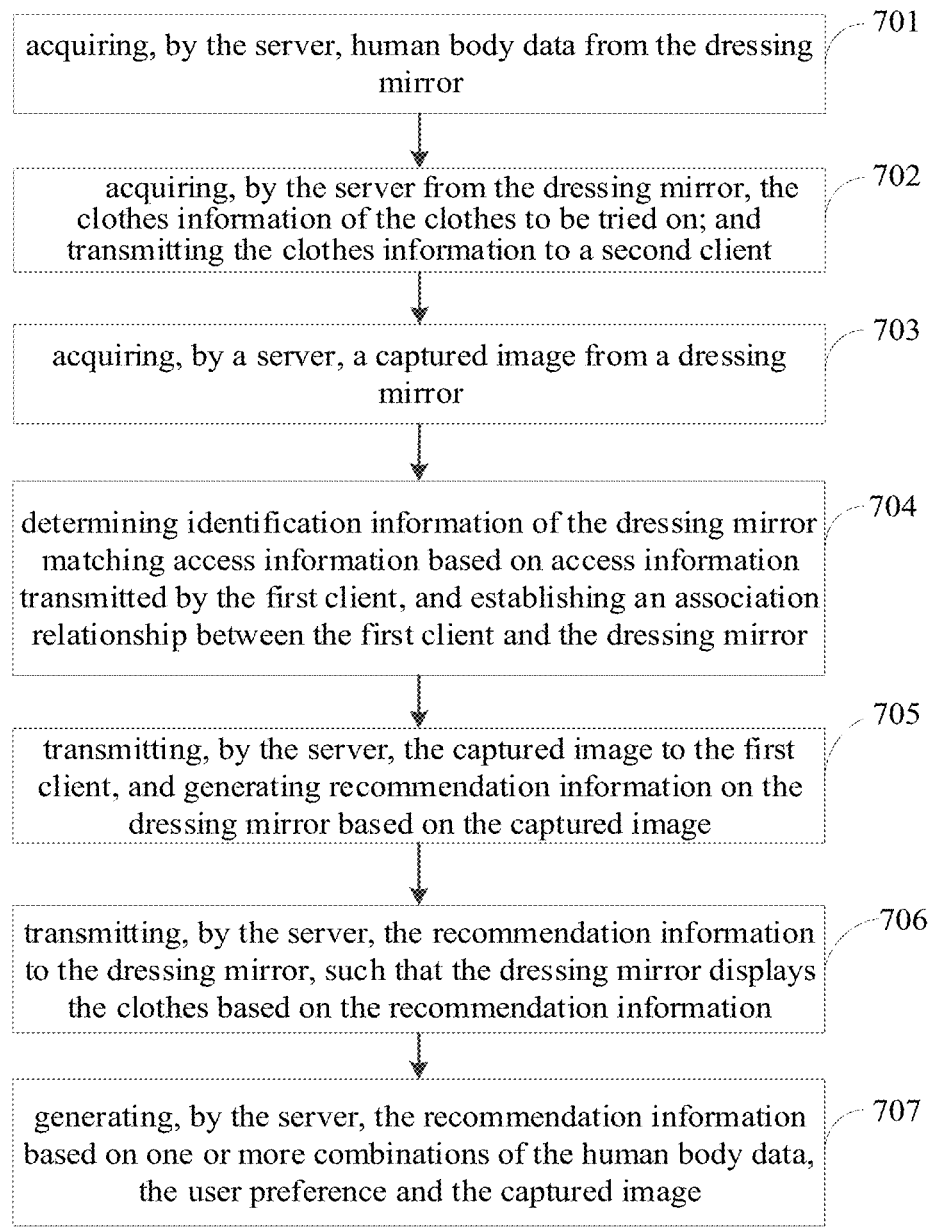
FIG. 7 is a schematic flow chart illustrating yet another information processing method based on clothes trying on according to embodiments of the present disclosure.

In order to more clearly describe the previous embodiments, the present disclosure provides a possible implementation of still another information processing method based on clothes trying on. FIG. 7 is a schematic flow chart illustrating still another information processing method based on clothes trying on according to embodiments of the present disclosure. As illustrated in FIG. 7, the method may include the following.

At block 701, the server acquires the human body data from the dressing mirror.

The human body data are obtained from an image captured by a camera that is driven by the dressing mirror in a case of determining by the dressing mirror that the face recognized with the face recognition is different to the human face recognized in the last awakening process, in response to detecting the human by the dressing mirror. The human body data may include at least one of the human body contour or the human body appearance.

At block 702, the server acquires the clothes information of the clothes to be tried on from the dressing mirror and transmits the clothes formation of the clothes to be tried on to the second client.

The clothes information of the clothes to be tried on is determined based on the trying-on operation, in response to detecting by the dressing mirror during the display of the clothes, the trying-on operation. The second client refers to a client used by the user who may respond to the trying-on operation. For example, the second client is the client used by a salesman of a store in which the dressing mirror is located.

In detail, the server acquires the clothes information, determined by the dressing mirror, of the clothes to be tried on by the user from the dressing mirror. The clothes information of the clothes to be tried on is transmitted the second client, such that the clothes information of the clothes to be tried on is provided to the user by the user corresponding to the second client to be fitted on.

At block 703, the server acquires the captured image from the dressing mirror.

The captured image is obtained by an image capturing module invoked by the dressing mirror in response to the photographing operation, in a case of detecting by the dressing mirror that the user operation is the photographing operation, when the user is trying on the clothes.

At block 704, the server determines, based on the access information sent by the first client, the identification information of the dressing mirror matching access information and establishes the association relationship between the first client and the matched dressing mirror.

In detail, in a case where the first client accesses the server based on the identification information of the dressing mirror, the identification information of the dressing mirror matching the access information may be determined based on the access information transmitted by the first client. In addition, the association relationship between the first client and the matched dressing mirror may be established.

At block 705, the server transmits the captured image to the corresponding first client, and generates the recommended information of the dressing mirror based on the captured image.

In detail, the server transmits the captured image of the user to the corresponding first client. In addition, analysis is performed based on the captured image, to obtain, from the captured image, information such as the ID, the style and the color of the clothes tried on in a trying-on process. The clothes preference of the user may be deduced based on the information, thereby generating more accurate recommendation information of the clothes for the user.

At block 706, the server transmits the recommendation information to the dressing mirror end, such that the dressing mirror may display the clothes based on the recommendation information.

In detail, the server transmits the recommendation information of the dressing mirror to the dressing mirror, such that the dressing mirror further displays the clothes based on the recommendation information, as well as displaying the recommendation information, such as hot sale, recommended by the store manager and the like.

At block 707, the server generates and pushes the recommendation information based on one or more combinations of the human body data, the user preference and the captured image to the first client.

In detail, the user preference refers to the user preference of the first client obtained by the server based on the social account number followed by the first client. After the user follows the social account through the first client, since the social account number may contain pushing information and may push the recommendation information to the user regularly, the user preference of the first client may be obtained through a clicking operation and a stay time of the user performed on the recommendation information. The server may generate the recommendation information based on one or more combinations of the human body data, the user preference and the captured image. The recommendation information may be pushed to the first client. The accuracy of the recommendation information pushed to the first client corresponding to the user may be improved.

With the information processing method based on clothes trying on according to embodiments of the present disclosure, the server acquires the captured image from the dressing mirror. The captured image is transmitted to the first client for analyzing based on the captured image to deduce the clothes preference of the user, More accurate recommendation information of the clothes may be generated based on the clothes preference of the user. The recommendation information of the clothes is transmitted to the dressing mirror, for displaying by the dressing mirror to the user. By acquiring the trying-on data of the user and performing the analysis on the trying-on data to obtain the user preference, the recommendation information of the clothes is generated based on the user preference. Therefore, more accurate recommendation information of the clothes is generated by acquiring and utilizing the user data, thereby improving accuracy of the recommendation information of the clothes and increasing the user viscosity.

Figure 8:
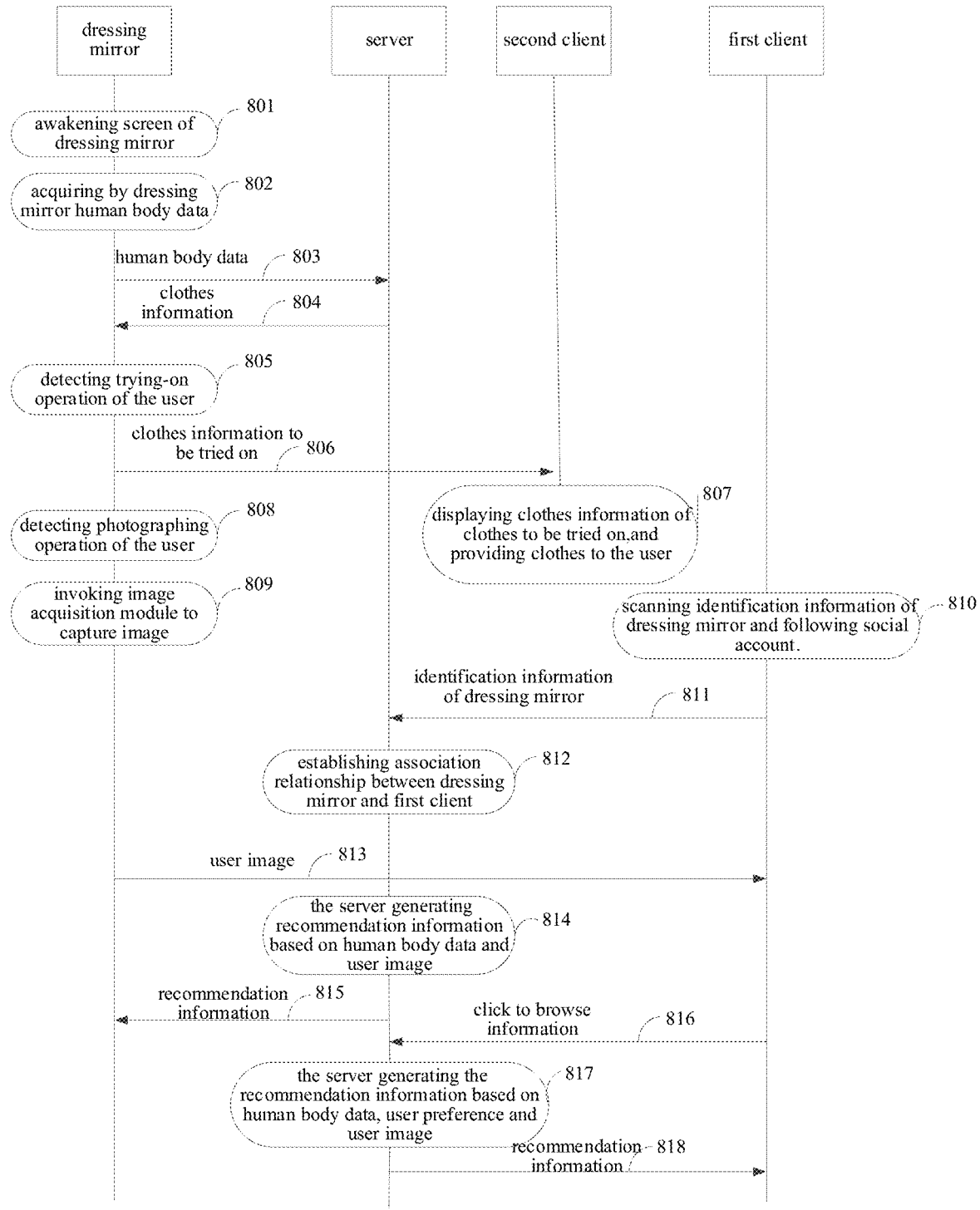
FIG. 8 is a schematic flow chart illustrating an interaction method of processing information based on clothes trying on according to embodiments of the present disclosure.

Based on the above embodiment, in order to more clearly illustrate the above embodiments embodiments of the present disclosure propose a possible implementation of an interaction method of processing information based on clothes trying on. FIG. 8 is a schematic flow chart illustrating an interaction method of processing information based on clothes trying on according to embodiments of the present disclosure. As illustrated in FIG. 8, the method may include the following.

At block 801, the screen of the dressing mirror is awakened.

In detail, the dressing mirror may capture the image when the mirror surface of the dressing mirror is in the screen-locking state. The face recognition is performed based on the captured image. In a case that the face recognized is different from the human face recognized in the last awakening process, the dressing mirror is awakened from the screen-locking state to the displaying state.

At block 802, the dressing mirror collects the human body data.

In detail, the human body data includes at least one of the human body contour or the human body appearance.

At block 803, the dressing mirror its the human body data to the server.

In detail, the dressing mirror transmits the collected human body data to the server, such that the server generates, based on the human body data, the clothes information that is in conformity with the characteristics of the human body data of the user. For example, if the human body data indicates that the user is plump, the generated clothes information is loose clothes, but the fitting clothes is not recommended.

At block 804, the server transmits the clothes information to the dressing mirror.

In detail, the server transmits the clothes information to the dressing mirror, and the dressing mirror displays the clothes information.

At block 805, the dressing mirror detects the trying-on operation of the user.

In detail, during the display of the clothes by the dressing mirror end through the display items, the trying-on control configured to acquire the trying-on operation may be displayed in a case where a period of time for displaying a certain display item reaches a preset duration. In another example, the trying-on control may be displayed correspondingly during the display of the clothes through the display items.

At block 806, the dressing mirror transmits the clothes information of the clothes selected by the user for trying on to the second client through the server.

The second client refers to the client used by the user who may respond to the user trying-on operation. For example, the second client is the client used by the salesman of the store where the dressing mirror is located.

At block 807, the second client display the clothes information of the clothes to be tried on and provides the clothes to be tried on to the user.

At block 808, the dressing mirror detects the photographing operation of the user.

In detail, during the trying-on process of the user, the dressing mirror may prompt the user to click the photographing control in voice to capture the image. The prompt information may be displayed on the display screen of the dressing mirror, as well as detecting in real time whether the user executes the photographing operation.

At block 809, the image capturing module invoked by the dressing mirror to capture the image.

In detail, when the dressing mirror detects that the user operation is the photographing operation, the dressing mirror may invoke the image capturing module to capture the image in response to the photographing operation.

At block 810 the first client scans the identification information of the dressing mirror to follow the social account.

In detail, after the photographing is finished by the dressing mirror the user may be prompted in voice to scan the identification information to follow the social account.

At block 811 the first client transmits the identification information of the dressing mirror to the server.

In detail, the first client scans identification information to follow the social account. The identification information of the dressing mirror is sent to the server. For example, the user corresponding to the first client scans the identification information, i.e., the two-dimensional code, through an application of WeChat to follow the corresponding social account.

At block 812, the server establishes the association relationship between the dressing mirror and the first client.

In detail, the server identifies the corresponding dressing mirror based on the received identification information transmitted by the first client, establishes the association relationship between the dressing mirror and the first client, and transmits confirmation information indicating that the association relationship is successfully established to the dressing mirror.

At block 813, the dressing mirror transmits the user image to the first client through the server based on the association relationship.

At block 814, the server generates the recommendation information based on the human body data and the user image.

In detail, the server may analyze and acquire more information about the human body and clothes characteristics of the user based on the human body data and the user image, such that the recommendation information of the clothes generated based on the information is more accurate.

At block 815, the server transmits the recommendation information to the dressing mirror.

At block 816, the first client transmits click-to-browse information in the social account to the server.

In detail, the social account followed by the first client includes the recommendation information of various clothes. The user corresponding to the first client may click and select corresponding clothes information for viewing based on his/her preference. The server may acquire user preference information based on the clothes pushing information clicked by the user and the stay time of the user on the pushing information acquired from the first client.

At block 817, the server generates the recommendation information based on the human body data, the user preference and the user image.

In detail, the server may generate more accurate recommendation information based on the human body data, the user preference and the user image, thereby improving the interest of the user. The recommendation information may include clothes information interest of the user, purchase address, price information, discount information, size and inventory information of the corresponding clothes, thereby improving convenience for the user to purchase.

At block 818, the server transmits the recommendation information to the first client.

In detail, the server transmits the recommendation information to the first client, such that the user may check the pushed information through the first client.

With the interaction method for processing information based on clothes trying on according to embodiments the present disclosure, the human body data of the user may be collected by the dressing mirror to display the clothes. The user is prompted to try on the clothes during the display of the clothes. In a case of detecting the trying-on operation of the user, the clothes to be tried on are transmitted to the second client, such that the second client provides trying-on service based on the clothes to be tried on. In addition, the dressing mirror prompts the user to take a picture to store the current trying-on picture and prompts the user to scan the identification information of the dressing mirror to follow the social account and to acquire the captured picture. The association relationship between the dressing mirror and the first client is established. The server generates the recommendation information based on the human body data and the user image, for displaying by the dressing mirror. Therefore, the recommendation information of the clothes is generated base on the user information, thereby providing a reference and convenience for the user to select the clothes. In addition, the user preference is obtained based on information such as a clicking operation of the riser on the pushing information in the social account, such that the server may generate more accurate clothes pushing information based on the human body data, the user image and the user preference. The clothes pushing information is transmitted to the client regularly, the convenience may be provided tor the user to purchase the clothes, and the satisfaction of the user may be improved.

In order to implement above embodiments, the present disclosure further provides an information processing apparatus based on clothes trying on.

Figure 9:
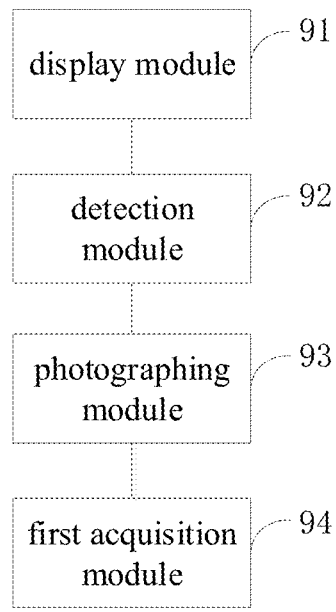
FIG. 9 is a schematic block diagram illustrating an information processing apparatus based on clothes trying on according to embodiments of the present disclosure.

FIG. 9 is a schematic block diagram illustrating an information processing apparatus based on clothes trying on according to embodiments of the present disclosure. The apparatus is disposed at the dressing mirror end, and to execute the information processing method based on clothes trying on described in the corresponding embodiments illustrated as FIG. 1 to FIG. 2.

As illustrated in FIG. 9, the apparatus may include a displaying module 91, a detection module 92, a photographing module 93 and a first acquisition module 94.

The displaying module 91 may be configured to display the clothes by the dressing mirror based on the clothes information.

The detection module 92 may be configured to detect the user operation by the dressing mirror during the display of the clothes.

The photographing module 93 may be configured to, in a case of detecting that the user operation is the photographing operation, capture the image by an image capturing module invoked by the dressing mirror, in response to the photographing operation and transmit the captured image to the first client through the server.

The first acquisition module 94 may be configured to, in a case that the server generates recommendation information based on the captured image, acquire, by the dressing mirror, the recommendation information from the server and display the clothes based on the recommendation information.

Further, in a possible implementation of embodiments of the present disclosure, the apparatus may further include an identification module.

The identification module may be configured to capture the image in a case where the mirror surface of the dressing mirror is in the screen-locking state, to execute the face recognition by the dressing mirror based on the captured image, and in response to detecting that the face recognized is different from the face recognized in a last awakening process, awaken the mirror surface of the dressing mirror from the screen-locking state to the displaying state.

In another possible implementation of embodiments of the present disclosure, the apparatus may further include an acquisition module.

The acquisition module may be configured to collect human body data by the dressing mirror. The human body data may include at least one of the human body contour or the human body appearance.

In another possible implementation of embodiments of the present disclosure, the apparatus may further include a transmitting module.

The transmitting module may be configured to transmit the human body data to the server. The server may be configured to generate the recommendation information based on the human body data and the captured image.

In another possible implementation of embodiments of the present disclosure, the apparatus may further include a showing module and a second acquisition module.

The showing module is configured to show the identification information by the dressing mirror. The server may be configured to access the dressing mirror based on identification. An association relationship between the first client and the dressing mirror through the server.

The second acquisition module may be configured to determine to execute, by the dressing mirror, transmit the captured image to the first client through the server in response to obtaining by the dressing mirror from the server, a message indicating a successful establishment of the association relationship.

In another possible implementation of embodiments of the present disclosure, the apparatus may further include a determining module.

The determining module may be configured to determine by the dressing mirror that the first client already scans and acquires the identification information based on the message indicating the successful establishment of the association relationship. The first client s configured to follow a social account based on the identification information. The server is configured to acquire the user preference of the user of the first client. The server is further configured to generate the recommendation information based on the captured image and the user preference.

In another possible implementation of embodiments of the present disclosure, the apparatus may further include a trying-on module.

The trying-on module may be configured to, in a case of detecting that a user operation is the trying-on operation, in response to the trying-on operation, determine by the dressing mirror the clothes information of the clothes to be tried on based on the trying-on operation, and transmit by the dressing mirror the clothes information of the clothes to be tried on to the second client.

In another possible implementation of embodiments of the present disclosure, the detection module 92 is further configured to during the display of the clothes by the dressing mirror through a display item, display a trying-on control configured to acquire the trying-on operation is respond to detecting that a period of time for displaying a display item reaches a preset duration; or display the trying-on control correspondingly during the display of the clothes through the display item.

It should be noted that the above explanation of embodiments of the method executed by the dressing mirror is also applicable to embodiments of the apparatus, and the implementation principle is similar, which is not elaborated here.

The division of the modules in the information processing apparatus based on clothes trying on is only used for illustration. In other embodiments, the information processing apparatus based on clothes frying on may be divided into different modules as required to implement all or part of functions of the information processing apparatus based on clothes trying on.

With the information processing apparatus based on clothes trying on according to embodiments of the present disclosure, the clothes is displayed by the dressing mirror based on the clothes information. The user operation is detected by the dressing mirror during the display of the clothes. In response to detecting that the user operation is the photographing operation, the captured image of the user is acquired by the dressing mirror and is transmitted to the server for analyzing the trying-on data of the user. The recommended information generated by the server based on the captured image is received and displayed. Therefore, it is realized that more accurate recommendation information of the clothes is displayed for the user based on the user data collected. In addition, the captured image is transmitted to the client through the server, and the association relationship between the server and the client is established, to further recommend the clothes information to the client, thereby improving the user viscosity. A problem existing in the related art that the dressing mirror cannot further provide the recommendation information of the clothes to the user since the function of the dressing mirror is monotonous may be solved.

Figure 10:
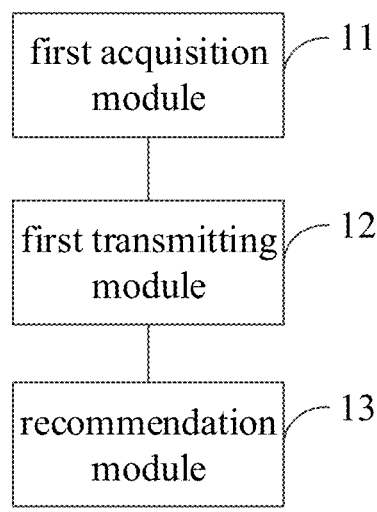
FIG. 10 is a schematic block diagram illustrating another information processing apparatus based on clothes trying on according to embodiment of the present disclosure.

In order to implement above embodiments, embodiments of the present disclosure further provide a possible implementation of the information processing apparatus based on clothes trying on, FIG. 10 is a schematic block diagram illustrating another information processing apparatus based on clothes trying on according to embodiments of the present disclosure. The apparatus is disposed at the server and is configured to execute the information processing method based on clothes trying on described in embodiments illustrated as FIG. 6 to FIG. 7.

As illustrated in FIG. 10, the apparatus may include: a first acquisition module 11, a first transmitting module 12 and a recommendation module 13.

The first acquisition module 11 may be configured to acquire by the server the captured image from the dressing mirror. The captured image is acquired by the image capturing module invoked by the dressing mirror in response to the photographing operation, in a case of detecting that the user operation is the photographing operation when the dressing mirror displays the clothes based on the clothes information.

The first transmitting module 12 may be configured to transmit by the server the captured image to the first client correspondingly and generate by the server recommendation info, illation based on the captured image.

The recommendation module 13 may be configured to transmit the recommendation information to the dressing mirror such that the dressing mirror may display the clothes based on the recommendation information.

Further, as a possible implementation embodiments of the present disclosure, the apparatus may further include a second acquisition module, a third obtaining module, a generation module.

The second acquisition module may be configured to acquire by the server human body data from the dressing mirror. The human body data may include at least one of the human body contour or the human body appearance.

The third obtaining module may be configured to acquire by the server the user preference of the user of the first client through the social account followed by the first client.

The generation module may be configured to generate the recommendation by the server information based on one or more combinations of the human body data, the user preference and the captured image.

As another possible implementation of embodiments of the present disclosure, the apparatus may further include a pushing module.

The pushing module may be configured to the push information to the first client through the social account based on the recommendation information.

As another possible implementation of embodiments of the present disclosure, the apparatus may further include an association module.

The association module may be configured to, in a case that the first client access the server, determine identification information of the dressing mirror matching the access information based on the access information transmitted by the first client and establish the association relation between the first client and the matched dressing mirror.

As another possible implementation of embodiments of the present disclosure, the apparatus may further include a fourth acquisition module end a second transmitting module.

The fourth acquisition module may be configured to acquire by the server the clothes information of the clothes to be tried on from the dressing mirror.

The second transmitting module may be configured to transmit the clothes information of the clothes to be tried on to the second client.

It should be noted that the above explanation of embodiments of the method executed by the server may be also applicable to embodiments of the apparatus, and the implementation principle is similar, which is not elaborated here.

The division of the modules in the information processing apparatus based on clothes trying on is only used for illustration. In other embodiments, the information processing apparatus based on clothes trying on may be divided into different modules as required to implement all or part of the functions of the information processing apparatus based on clothes trying on.

With the information processing apparatus based on clothes trying on according to embodiments of the present disclosure, the clothes is displayed by the dressing mirror based on the clothes information. The user operation is detected by the dressing mirror during the display of the clothes process. In a case of detecting that the user operation is the photographing operation, in response to the photographing operation, the captured image of the user is acquired by the dressing mirror and is transmitted to the server for analyzing the trying-in data of the user. The recommendation information generated by the server based on the captured image is generated and is displayed. Therefore, more accurate recommendation information of the clothes is displayed for the user based on the user data acquired. In addition, the captured image is transmitted to the client through the server and the association relationship between the server and the client is established to further recommend the clothes information to the client, thereby improving the user viscosity. A problem existing in the related art that the dressing mirror cannot further provide the recommendation information of the clothes since the function of the dressing mirror is monotonous is solved.

In order to implement the above embodiment, embodiments the present disclosure further provide a computer device. The computer device includes a memory, a processor and a computer program stored on the memory and executable on the processor. When the program is executed by the processor, the information processing method based on clothes trying on according to the above method embodiments may be implemented.

In order to implement the above embodiments, the present disclosure further provides a computer-readable storage medium. The computer-readable storage medium includes a computer program stored thereon. When the computer program is executed by the processor, the processor is configured to implement the information processing method based on clothes trying on according to the above method embodiments.

In the description of the specification, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without contradiction.

Furthermore, terms such as "first" and "second" are used herein for purposes of description and are not intended to indicate or imply relative importance or significance, or imply the number of technical features defined by the above terms. Thus, the feature defined with "first" and "second" may include one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, including an order of functions that is not illustrated and described herein, such as substantially simultaneous order or a reverse order, to execute the functions, which should be understood by those skilled in the art.

The logic and/or step described in other manners herein or shown in the flow chart, for example, may be considered as a particular sequence table of executable instructions for realizing the logical function, that may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (a non-exhaustive list) of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or combination thereof. In the above implementations, multiple steps or methods may be realized by software or firmware stored in the memory and executed by an appropriate instruction execution system. For example, if it is realized by the hardware, likewise in another embodiment, it may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried out by the method in the above-described embodiments may be implemented by relevant hardware instructed by a program. The program may be stored in a computer readable storage medium. When the program is executed, one or a combination of the steps of the method in the above-described embodiments may be implemented.

In addition, individual functional units in the embodiments of e present disclosure may be integrated in one processing module or may be separately physically present, or two or more units may be integrated in one module. The integrated module as described above may be achieved in the form of hardware, or may be achieved in the form of a software functional module. If the integrated module is achieved, in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An information processing method based on clothes trying on, comprising:

activating, by a dressing mirror, a camera to capture a first image when a mirror surface of the dressing mirror is in a screen-locking state;

executing, by the dressing mirror, a face recognition on the first image with a face recognition algorithm;

awakening the dressing mirror from the screen-locking state to a displaying state in response to detecting that a face recognized is different from the face recognized in a last awakening process;

displaying, by the dressing mirror, clothes based on clothes information;

detecting, by the dressing mirror, a user operation during displaying the clothes;

in a case of detecting that a user operation is a photographing operation, in response to the photographing operation, capturing a second image and transmitting the second image to a first client through a server; and in a case that the server generates recommendation information by combining trying-on clothes information identified in the second image with clothes information of interest comprised in user preference, acquiring, by the dressing mirror, recommendation information from the server and displaying the clothes of interest based on the recommendation information, wherein after the first client already scans identification information of a social account on the dressing mirror to access the server, the server is configured to acquire the user preference through the social account that is followed by the first client, wherein the social account includes pushing information, and the user preference is determined through a clicking operation and a stay time of a user performed on the pushing information.

2. The information processing method of claim 1, the method further comprises:

acquiring, by the dressing mirror, human body data; in which the human body data comprises at least one of a human body contour or a human body appearance.

3. The information processing method of claim 2, wherein the method further comprises:

transmitting the human body data to the server; in which the server is configured to generate the recommendation information based on the user preference and the human body data.

4. The information processing method of claim 1, wherein the method further comprises:

displaying, by the dressing mirror, the identification information; in which the first client is configured to access the server based on the identification information, and an association relationship between the first client and the dressing mirror is established through the server; and transmitting, by the dressing mirror the second image to the first client through the server in response to acquiring, by the dressing mirror from the server, a message indicating a successful establishment of the association relationship.

5. The information processing method of claim 4, wherein the method further comprises:

determining, by the dressing mirror, that the first client already scans and acquires the identification information based on the message indicating the successful establishment of the association relationship.

6. The information processing method of claim 1, wherein the method further comprises:

in a case that the user operation is a trying-on operation, in response to the trying-on operation, determining, by the dressing mirror, the clothes information of the clothes to be tried on based on the trying-on operation; and transmitting, by the dressing mirror, the clothes information of the clothes to be tried on to a second client.

7. The information processing method of claim 1, wherein detecting, by the dressing mirror the user operation during displaying the clothes comprises:

during displaying the clothes by the dressing mirror through a display item, displaying a trying-on control configured to acquire a trying-on operation in response to detecting that a period of time for displaying a display item reaches a preset duration; or displaying the trying-on control correspondingly during displaying the clothes through the display item.

8. An information processing method based on clothes trying on, comprising:
acquiring, by a server, a second image from a dressing mirror; wherein the second image is captured by a camera in the dressing mirror in response to a photographing operation during displaying by the dressing mirror the clothes based on clothes information;
transmitting, by the server, the second image to a first client correspondingly and generating recommendation information by combining trying-on clothes information identified in the second image with clothes information of interest comprised in user preference; and
transmitting, by the server, the recommendation information to the dressing mirror, such that the dressing mirror displays the clothes based on the recommendation information;
wherein before the clothes are displayed by the dressing mirror based on the clothes information, the dressing mirror is configured to activate the camera to capture a first image when a mirror surface of the dressing mirror is in a screen-locking state, execute a face recognition on the first image with a face recognition algorithm and awaken the dressing mirror from the screen-locking state to a displaying state in response to detecting that a face recognized is different from the face recognized in a last awakening process;
wherein the method further comprises:
acquiring, by the server, user preference through a social account that is followed by the first client, after the first client already scans identification information of the social account on the dressing mirror to access the server, in which the social account includes pushing information and the user preference is determined through a clicking operation and a stay time of the user performed on the pushing information.

9. The information processing method of claim 8, wherein the method further comprises:
acquiring, by the server, human body data from the dressing mirror, in which the human body data comprises at least one of a human body contour or a human body appearance; and
generating, by the server, the recommendation information based on the human body data, and the user preference.

10. The information processing method of claim 9, wherein the method further comprises:
pushing information to the first client through the social account based on the recommendation information.

11. The information processing method of claim 8, wherein before transmitting, by the server, the second image to the first client correspondingly, the method further comprises:
in a case that the first client accesses the server, determining the identification information of the dressing mirror matching access information based on the access information transmitted by the first client; and
establishing an association relationship between the first client and the dressing mirror.

12. The information processing method of claim 8, further comprising:
acquiring, by the server from the dressing mirror, the clothes information of the clothes to be tried on; and
transmitting, by the server, the clothes information of the clothes to be tried on to a second client.

13. A computer device, comprising: a memory, a processor and a computer program stored on the memory and executable on the processor; wherein when the program is executed by the processor, an information processing method based on clothes trying on is implemented, the information processing method comprising:
activating, by a dressing mirror, a camera to capture a first image when a mirror surface of the dressing mirror is in a screen-locking state;
executing, by the dressing mirror, a face recognition on the first image with a face recognition algorithm;
awakening the dressing mirror from the screen-locking state to a displaying state in response to detecting that a face recognized is different from the face recognized in a last awakening process;
displaying, by the dressing mirror, clothes based on clothes information;
detecting, by the dressing mirror, a user operation during displaying the clothes;
in a case of detecting that a user operation is a photographing operation, in response to the photographing operation, capturing a second image, and transmitting the second image to a first client through a server; and
in a case that the server generates recommendation information by combining trying-on clothes information identified in the second image with clothes information of interest comprised in user preference, acquiring, by the dressing mirror, the recommendation information from the server and displaying the clothes based on the recommendation information;
wherein after the first client already scans identification information of a social account on the dressing mirror to access the server, the server is configured to acquire the user preference through the social account that is followed by the first client,
wherein the social account includes pushing information, and the user preference is determined through a clicking operation and a stay time of a user performed on the pushing information.

14. The computer device of claim 13, wherein the method further comprises:
acquiring, by the dressing mirror, human body data; in which the human body data comprises at least one of a human body contour or a human body appearance.

15. The computer device of claim 14, wherein the method further comprises:
transmitting the human body data to the server; in which the server is configured to generate the recommendation information based on user preference and the human body data.

16. The computer device of claim 13, herein the method further comprises:
displaying, by the dressing mirror, the identification information; in which the first client is configured to access the server based on the identification information, and an association relationship between the first client and the dressing mirror is established through the server; and
transmitting, by the dressing mirror the second image to the first client through the server in response to acquiring, by the dressing mirror from the server, a message indicating a successful establishment of the association relationship.

17. The computer device of claim 16, wherein the method further comprises:
determining, by the dressing mirror, that the first client already scans and acquires the identification information based on the message indicating the successful establishment of the association relationship.

18. The computer device of claim 13, wherein the method further comprises:
   in a case that the user operation is a trying-on operation, in response to the trying-on operation, determining, by the dressing mirror, the clothes information of the clothes to be tried on based on the trying-on operation; and
   transmitting, by the dressing mirror, the clothes information of the clothes to be tried on to a second client.

* * * * *